(12) United States Patent
Ryu et al.

(10) Patent No.: US 8,474,488 B2
(45) Date of Patent: Jul. 2, 2013

(54) LOW PRESSURE ACCUMULATOR FOR ANTI-LOCK BRAKE SYSTEM

(75) Inventors: Dong Yo Ryu, Seoul (KR); Min Geun Song, Daejeon (KR)

(73) Assignee: Mando Corporation, Pyeongtaek-Si (KR)

( * ) Notice: Subject to any disclaimer, the term of this patent is extended or adjusted under 35 U.S.C. 154(b) by 123 days.

(21) Appl. No.: 13/107,395

(22) Filed: May 13, 2011

(65) Prior Publication Data

US 2011/0277863 A1    Nov. 17, 2011

(30) Foreign Application Priority Data

May 13, 2010    (KR) .................. 10-2010-0044719

(51) Int. Cl.
*F16L 55/04* (2006.01)
(52) U.S. Cl.
USPC ............................................. 138/31; 138/30
(58) Field of Classification Search
USPC ...................................................... 138/31, 30
See application file for complete search history.

(56) References Cited

U.S. PATENT DOCUMENTS

| | | | |
|---|---|---|---|
| 5,735,314 A * | 4/1998 | Alaze et al. ..................... | 138/31 |
| 6,360,778 B1 * | 3/2002 | Vennemeyer et al. .......... | 138/31 |
| 6,390,133 B1 * | 5/2002 | Patterson et al. ............... | 138/31 |
| 6,612,339 B1 * | 9/2003 | Wilke et al. ..................... | 138/31 |
| 7,971,608 B2 * | 7/2011 | Crimpita ......................... | 138/31 |
| 2003/0205283 A1 * | 11/2003 | Maloney et al. ................ | 138/31 |
| 2007/0114840 A1 | 5/2007 | Briesewitz et al. | |

FOREIGN PATENT DOCUMENTS

| | | |
|---|---|---|
| JP | 2002-200972 | 7/2002 |
| JP | 2008-105628 | 5/2008 |

* cited by examiner

*Primary Examiner* — Patrick F Brinson
(74) *Attorney, Agent, or Firm* — McDermott Will & Emery LLP

(57) ABSTRACT

A low pressure accumulator for an anti-lock brake system of a vehicle. The low pressure accumulator includes a cylinder having one end communicated with a fluid path connected to a valve and a pump and an opposite end formed with an opening, a piston moving back and forth in the cylinder, a spring installed in the cylinder to elastically support the piston, and a plug installed in the opening of the cylinder to support one end of the spring. The plug includes a vent to ventilate air through an inside and an outside of the cylinder.

11 Claims, 4 Drawing Sheets

LOW PRESSURE ACCUMULATOR FOR ANTI-LOCK BRAKE SYSTEM

This application claims the benefit of Korean Patent Application No. 10-2010-0044719 filed on May 13, 2010, in the Korean Intellectual Property Office, the disclosure of which is incorporated herein by reference.

BACKGROUND

1. Field

The disclosure relates to an anti-lock brake system. More particularly, the disclosure relates to a plunger of a low pressure accumulator.

2. Description of the Related Art

In general, an anti-lock brake system is installed in a vehicle to prevent wheels from slipping by intermittently controlling braking force applied to the wheels for the purpose of safe braking of the vehicle.

Such a brake system includes a master cylinder to generate braking pressure by receiving braking force, which is derived from the operation of a brake pedal and amplified by a booster, a solenoid valve to control the braking pressure transferred to hydraulic brakes provided at front and rear wheels, an accumulator to attenuate the pressure pulsation of oil, and a pump operated by a motor. The above elements are arranged along a hydraulic line.

Meanwhile, the solenoid valve is installed in the hydraulic line of each hydraulic brake to control the braking pressure generated from the master cylinder and a low pressure accumulator is installed below the solenoid valve to temporarily store oil discharged from the hydraulic brake in the pressure reduction mode. In addition, the pump is installed in the vicinity of an exhaust port of the low pressure accumulator to compress low pressure oil and to pump the compressed low pressure oil to a high pressure accumulator. The oil exhausted from the high pressure accumulator is circulated to the master cylinder or the solenoid valve.

Among the above components of the anti-lock brake system, the low pressure accumulator temporarily stores oil discharged from each brake during the pressure reduction process of the braking pressure in order to attenuate the pressure pulsation.

The low pressure accumulator includes a cylinder, a piston for keeping the interior of the cylinder in the air-tight state, a spring for elastically supporting the piston and a plug for opening/closing the cylinder while supporting the spring.

In addition, a vent seal and a vent cap are assembled with the plug in order to remove the pressure, which is generated in the cylinder due to the compression and expansion of air in the cylinder.

However, according to the related art, time and equipment are required to assemble the vent seal and the vent cap with the plug, so that the manufacturing cost may be increased.

SUMMARY

Accordingly, it is an aspect of the disclosure to provide an anti-lock brake system equipped with a low pressure accumulator capable of ventilating air by forming a vent in a plunger.

Additional aspects and/or advantages of the disclosure will be set forth in part in the description which follows and, in part, will be apparent from the description, or may be learned by practice of the disclosure.

The foregoing and/or other aspects of the disclosure are achieved by providing an anti-lock brake system including a low pressure accumulator. The low pressure accumulator comprises a cylinder having one end communicated with a fluid path connected to a valve and a pump and an opposite end formed with an opening, a piston moving back and forth in the cylinder, a spring installed in the cylinder to elastically support the piston, and a plug installed in the opening of the cylinder to support one end of the spring, wherein the plug includes a vent to ventilate air through an inside and an outside of the cylinder.

According to the disclosure, the plug is provided at an outer peripheral portion thereof with a flange and the vent is formed in the flange.

According to the disclosure, the vent is disposed between the low pressure accumulator and the plug.

According to the disclosure, the vent has a slot shape.

According to the disclosure, the vent has a variable depth.

As described above, according to the low pressure accumulator for the anti-lock brake system of the disclosure, air can be ventilated through the inside and the outside of the cylinder without using a separate member, so that the performance degradation caused by the pressure generated in the cylinder can be prevented.

In addition, since additional components are not necessary, the cost for the components can be saved.

BRIEF DESCRIPTION OF THE DRAWINGS

These and/or other aspects and advantages of the disclosure will become apparent and more readily appreciated from the following description of the embodiments, taken in conjunction with the accompanying drawings of which.

DETAILED DESCRIPTION OF THE EXEMPLARY EMBODIMENTS

Figure 1:
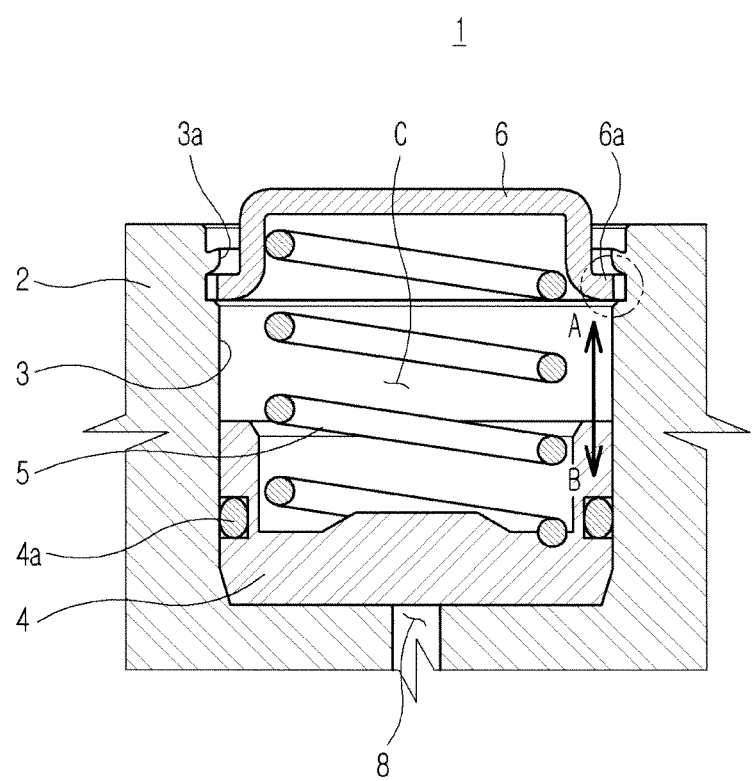
FIG. 1 is a sectional view schematically showing a low pressure accumulator according to the disclosure.

Reference will now be made in detail to the embodiments of the disclosure, examples of which are illustrated in the accompanying drawings, wherein like reference numerals refer to the like elements. The embodiments are described below to explain the disclosure by referring to the figures.

Figure 2:
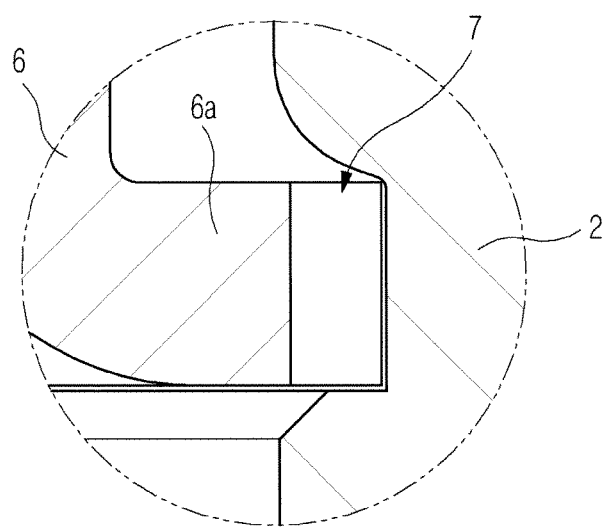
FIG. 2 is an enlarged view schematically showing a plug of a low pressure accumulator according to the disclosure.
Figure 3:
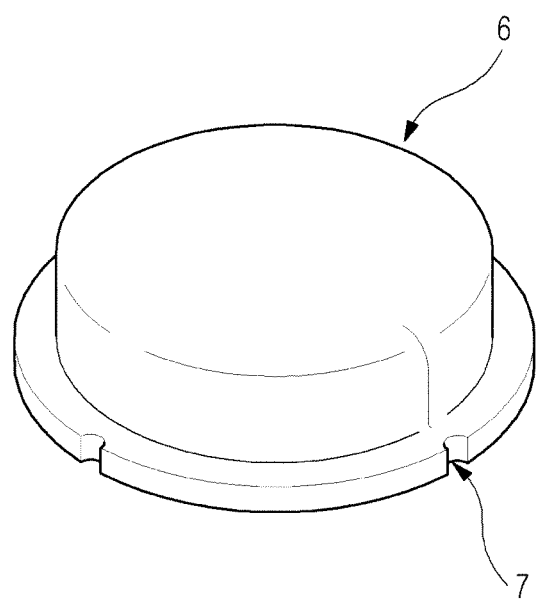
FIG. 3 is a perspective view schematically showing a plug of a low pressure accumulator according to the disclosure.
Figure 4:
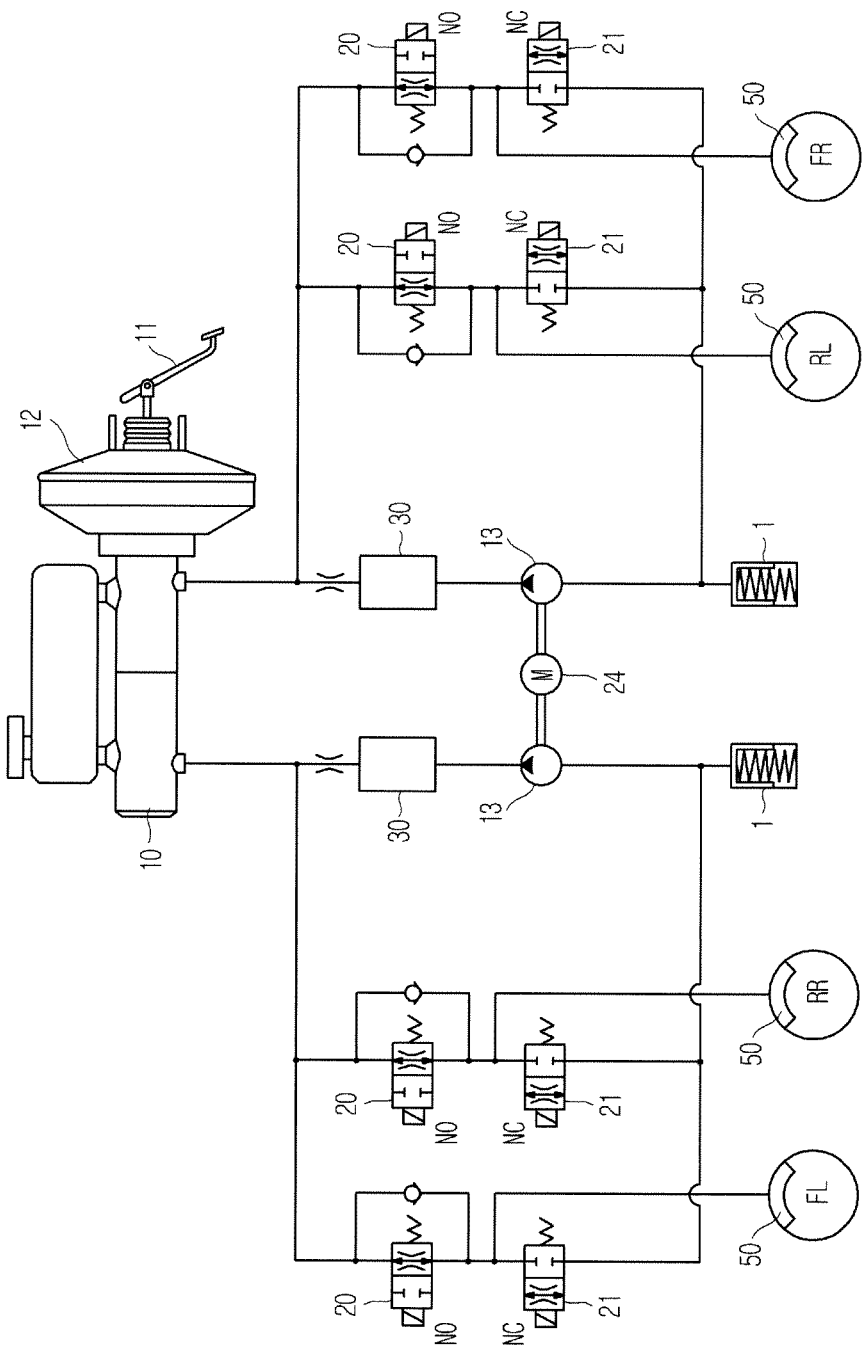
FIG. 4 is a hydraulic circuit view schematically showing the structure of an anti-lock brake system equipped with a low pressure accumulator according to the disclosure.

FIG. 1 is a sectional view schematically showing a low pressure accumulator according to the disclosure, FIG. 2 is an enlarged view schematically showing a plug of the low pressure accumulator according to the disclosure, FIG. 3 is a perspective view schematically showing the plug of the low pressure accumulator according to the disclosure, and FIG. 4 is a hydraulic circuit view schematically showing the structure of an anti-lock brake system equipped with the low pressure accumulator according to the disclosure.

As shown in the drawings, the low pressure accumulator 1 according to the disclosure includes a cylinder 3 provided at an inner surface of a modulator block 2 to define a storage cavity of oil, a piston 4 around which a piston ring 4a is fitted to keep the interior of the cylinder 3 in the air-tight state, a spring 5 for elastically supporting the piston 4, and a plug 6 for opening/closing an opening 3a of the cylinder 3 while supporting the spring 5.

One surface of the cylinder 3 is communicated with a fluid path 8 connected to a pump 13 and valves 20 and 21, which will be described later. If pressure of oil introduced through the fluid path 8 exceeds elastic force of the spring 5, the oil is stored in the oil storage cavity C formed in the cylinder 3 while pushing the piston 4 in the direction of "A". If brake oil is fed into the cylinder 3, the oil stored in the oil storage cavity C is discharged through the fluid path 8 in the vicinity of the pump 13 and the piston 4 is moved in the direction of "B" by the elastic force of the spring 5.

The plug 6 is provided on an outer peripheral surface thereof with a flange 6a and a vent 7 having a slot shape or a groove shape is formed in the flange 6a.

In detail, the vent 7 is disposed between the plug 6 and the modulator block 2.

A plurality of vents 7 may be arranged along the outer peripheral surface of the plug 6 and the depth and the size of the vents 7 may be variable.

The vent 7 removes the pressure generated in the oil storage cavity C by allowing air to flow into the interior of the cylinder 3, that is, the oil storage cavity C.

As shown in FIG. 4, if a driver steps on a brake pedal 11 while driving a vehicle, boosting force is generated from a booster 12 due to the pressure difference and a master cylinder 10 generates braking pressure by receiving amplified force from the booster 12.

The braking pressure is fed into wheel cylinders 50 provided at front wheels FL and FR and rear wheels RL and RR through a normally open (NO) type solenoid valve 20, thereby performing the braking operation.

If excessive braking force is generated on the basis of the road condition, the slip phenomenon may occur, that is, the wheels of the vehicle are slid. The slip phenomenon is detected by wheel sensors (not shown) equipped in the wheels of the vehicle and the wheel sensors transmits the signal to an electric control apparatus (not shown) of the anti-lock brake system.

At this time, the electric control apparatus opens a normally closed (NC) type solenoid valve 21 to discharge oil from the wheel cylinders 50, so that the braking pressure is lowered. Thus, the braking operation is temporarily released, thereby preventing the slip phenomenon.

In addition, the oil discharged through the NC type solenoid valve 21 is temporarily stored in the low pressure accumulator 1. As a motor 24 is driven, the oil passes through the pump 13, so that the oil having high pressure is exhausted into a high pressure accumulator 30.

Then, the oil is circulated from the high pressure accumulator 30 to the master cylinder 10 or the NO type solenoid valve 20. The above operation is repeated by the electric control apparatus, so that the fluid is circulated into the wheel cylinders 50 through the hydraulic line, thereby intermittently braking the wheels.

Meanwhile, the oil introduced into the low pressure accumulator 1 from the NC type solenoid valve 21 is transferred to the oil storage cavity C through the fluid path 8. If the pressure of the oil storage cavity C rises due to the oil introduced into the oil storage cavity C, the piston 4 is moved in the direction of "A" by the oil.

At this time, since the air is ventilated through the inside and the outside of the oil storage cavity C due to the vent 7 of the plug 6, the performance degradation caused by the pressure generated in the oil storage cavity C can be prevented.

In addition, the piston 4 moves back along the inner surface of the cylinder 3 by the oil until the piston 4 makes contact with the plug 6.

If the oil stored in the oil storage cavity C of the low pressure accumulator 1 is discharged through the fluid path 8 communicated with one end of the cylinder 3, the piston 4 is moved in the direction of "B" by the elastic force of the spring 5.

Although few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. An anti-lock brake system comprising:
   a low pressure accumulator,
   wherein the low pressure accumulator comprises:
   a cylinder having one end communicated with a fluid path connected to a valve and a pump and an opposite end formed with an opening;
   a piston moving back and forth in the cylinder;
   a spring installed in the cylinder to elastically support the piston; and
   a plug installed in the opening of the cylinder to support one end of the spring,
   plug includes a vent to ventilate air through an inside and an outside of the cylinder, and
   wherein the vent is formed in an outer peripheral surface of the plug.

2. The anti-lock brake system of claim 1, wherein the plug is provided at an outer peripheral portion thereof with a flange and the vent is formed in the flange.

3. The anti-lock brake system of claim 1, wherein the vent is disposed between the low pressure accumulator and the plug.

4. The anti-lock brake system of claim 1, wherein the vent has a slot shape.

5. The anti-lock brake system of claim 1, wherein the vent has a variable depth.

6. An anti-lock brake system comprising:
   a low pressure accumulator,
   wherein the low pressure accumulator comprises:
   a cylinder having one end communicated with a fluid path connected to a valve and a pump and an opposite end formed with an opening;
   a modulator block having a stepped groove formed at an inner peripheral surface of the cylinder adjacent to the opening;
   a piston moving back and forth in the cylinder;
   a spring installed in the cylinder to elastically support the piston;
   a plug including a flange inserted into the stepped groove and supporting one end of the spring; and
   a vent provided in the plug to ventilate air through an inside and an outside of the cylinder, and
   wherein the vent is formed by incising a peripheral portion of the flange to allow air to flow between the stepped groove and the flange.

7. The anti-lock brake system of claim 1, wherein the vent comprises a groove.

8. The anti-lock brake system of claim 1, wherein the vent comprises a plurality of grooves respectively arranged circumferentially around the outer peripheral surface.

9. The anti-lock brake system of claim 1, wherein the outer peripheral surface is a side surface.

10. The anti-lock brake system of claim 1, wherein the plug includes an outwardly extending flange, and the vent is formed in the flange.

11. The anti-lock brake system of claim 10, wherein the flange extends from an end of the plug which faces the piston.

\* \* \* \* \*